United States Patent [19]

Pitts et al.

[11] 4,339,352

[45] Jul. 13, 1982

[54] SORPTIVE CLAY COMPOSITION AND METHOD OF MANUFACTURE

[75] Inventors: Frank Pitts, Magalas, France; Jack A. Tiethof, South Plainfield; Robert A. Burns, Long Valley, both of N.J.

[73] Assignee: Engelhard Minerals & Chemicals Corporation, Menlo Park, N.J.

[21] Appl. No.: 238,272

[22] Filed: Feb. 25, 1981

[51] Int. Cl.$^3$ .............................................. B01J 21/20
[52] U.S. Cl. ..................................... 252/449; 501/147
[58] Field of Search ....................... 501/147, 148, 150; 252/449; 106/DIG. 4

[56] References Cited

U.S. PATENT DOCUMENTS

| | | | |
|---|---|---|---|
| 2,363,876 | 11/1944 | LaLande | 252/449 |
| 2,477,386 | 7/1949 | McCarter | 252/449 |
| 3,041,238 | 6/1962 | Allegrini | 167/55 |
| 3,953,292 | 4/1976 | Burns | 195/63 |

OTHER PUBLICATIONS

W. S. W. McCarter et al., "Thermal Activation of Attapulgus Clay", Industrial & Engineering Chemistry, vol. 42, pp. 529-533, 1950.

*Primary Examiner*—James Poer
*Attorney, Agent, or Firm*—Inez L. Moselle

[57] ABSTRACT

A novel sorptive clay product is formed by treating attapulgite clay with sodium silicate and heating to expel moisture such that the product contains about 7-20% total volatile matter. Acid may also be added such that the pH of aqueous slurry is in the range 5 to 10. This sorptive clay product exhibits water and oil absorption and resistance to wet breakdown equivalent to higher-temperature activated attapulgite products.

12 Claims, No Drawings

SORPTIVE CLAY COMPOSITION AND METHOD OF MANUFACTURE

BACKGROUND OF THE INVENTION

1. Field of the Invention

The present invention relates to clays having sorptive properties. Such clays are known collectively as fuller's earth and are characterized by the fact that they absorb water, oils and greases and are capable of removing undesirable constituents, such as dyes and coloring matter from aqueous solutions and from oils. Included in this group of clays are attapulgite, sepiolite, and bentonites.

2. Prior Art

Attapulgus clay, hereinafter referred to as attapulgite, has a wide variety of commercial uses deriving from its high surface area, sorptivity and decolorizing power. For many uses a comparatively hard granular material of high sorptive power is required which will not disintegrate on contact with water. Important uses of this type are materials used to absorb water and mixtures of oil and water from floors, materials used for animal bedding, commonly called pet litter and materials used as carriers for agricultural products. In many cases it is also desirable that the material should exhibit a substantially neutral pH in water.

Natural Attapulgus clay does not have sufficient sorptive properties or sufficient hardness for commercially practicable purposes and it is customary to apply various degrees of thermal activation to the clay in order to develop the required properties depending upon the purpose for which the product is to be used. The effect of thermal activation on Attapulgus clay is described in an article by W. S. W. McCarter, et al "Thermal Activation of Attapulgus Clay", Industrial & Engineering Chemistry, Vol. 42, No. 3 March 1950, pages 529 to 533. Sorptive properties and hardness adequate for some applications are obtained by heating the clay to a temperature of 400° to 500° F.; the product of this thermal activation retains much of the water of constitution, typically 15 to 18% as measured by volatile matter at 1200° F. However, such activated clays have little resistance to disintegration by contact with water which converts them to a sludge of fine particles. Such materials are not, therefore, practicable for many applications, such as floor absorbents and pet litter. In order to confer the necessary resistance to water, the clay must be activated at a higher temperature, typically 800° to 1000° F. which results in loss of most of the water of constitution, the product containing 5% or less of volatile matter at 1200° F. Although clays activated at these higher temperatures have the required sorptivity, hardness and resistance to water they are more costly to produce, particularly because of the greater energy requirements to raise the temperature and to drive off the water of constitution.

It is an objective of the present invention, therefore to provide a process for producing a sorptive clay of acceptable hardness and resistance to water disintegration without the need for the more extensive thermal activation heretofore required. It is a further objective of the invention to provide such a process wherein the product exhibits a substantially neutral pH in water.

SUMMARY OF THE INVENTION

The essence of the present invention resides in treating a sorptive clay with an alkali metal silicate, preferably sodium silicate, and heating the treated clay to expel free moisture and a proportion of the combined water such that the product contains less than 25% of volatile matter at 1200° F. Optionally the clay may also be treated with an acid in a proportion such that the final product after heat treatment has a pH when slurried with water in the range of about 5 to 10. The product has compositions in the range of about 85-99% by weight clay, 1-10% sodium silicate based on volatile-free weight of the clay, and about 0.3-3% acid based on volatile-free weight of the clay.

A preferred embodiment of the invention comprises a process in which Attapulgus clay is treated with a solution of sodium silicate in which the molecular ratio $SiO_2:Na_2O$ is at least 1.5:1 and the heated clay is then activated to increase its sorptive properties by heating to a temperature in the range 300° F. to 700° F. for a sufficient time to reduce the volatile matter when determined at 1200° F. to not more than 25% and preferably to not more than 20%. Optionally the clay is also treated with an acid selected from the group comprising phosphoric acid, sulphuric acid and water-soluble organic carboxylic acids. The amount of acid used is such that the pH of an aqueous slurry of the activated clay lies between 5 and 10, preferably between 6.0 and 9.5. Preferably the acid is phosphoric acid or acetic acid in amount of about 0.3-3% by volatile-free weight of the clay. The acid may be added to the clay before heat treament or after heat treatment.

DESCRIPTION OF THE PREFERRED EMBODIMENTS

A sorptive mineral suitable for practice of the present invention is Attapulgus clay or Georgia-Florida fuller's earth, which is composed principally of the mineral attapulgite, a crystalline hydrated magnesium aluminum silicate, but which also may contain significant amounts of mineral impurities such as montmonrillonite, calcium carbonate, quartz (silica) and feldspar, and in some cases sepiolite. This clay and processing thereof by heat-treatment to obtain special properties are well known in the art. Further detail on processing and resultant properties is disclosed in U.S. Pat. No. 3,953,292 to Burns and U.S. Pat. No. 3,041,238 to Allegrini. Heat treated attapulgite clays typically have a surface area of about 80–140 m.$^2$/g. as determined by standard B.E.T. method using nitrogen, a pore volume of about 0.5 to 0.8 cc./g, and a cationic exchange capacity in the range 5–40 meq./100 g., generally about 15–35 meq./100 g. clay. Other clays having sorptive properties equivalent to attapulgite clay may also be used in practice of the present invention. For example a sorptive grade of bentonite such as acid-activated bentonite may be used.

Attapulgite clay may be calcined by means conventional in the art, for example a rotary calciner. Calcination temperature range from about 400° to 1000° F. in general processing of this clay. Calcination at temperatures in the lower end of the aforementioned range give rise to an attapulgite clay having total volatile matter of about 16%. This clay is known as an RVM grade attapulgite clay and is preferred herein for economic reasons. The higher temperature range calcination gives rise to an attapulgite known as an LVM-grade clay of very low volatile matter of about 5% as produced. Total volatile matter of the clay as used, however, may range up to about 10% as a result of the mineral readily absorbing moisture from the atmosphere.

The product of the present invention is crushed and screened to size prior to sale and use. Different applications of the product require a different size range to fit the end use. Crushing and sizing may be done in a manner conventional in the art, e.g. by hammermill and screening. The product of the present invention may be made by mixing silicate solution and clay in conventional pugging or extrusion devices and subsequently drying, crushing and sizing. Alternatively, silicate solution may be sprayed onto raw clay prior to drying. Optional addition of an acid, to reduce pH of the product when slurried in water, takes place preferably after thermal treatment (drying). This may occur during the sizing or screening operation or immediately thereafter, wherein acid solution is sprayed onto the claysilicate material on the screens or onto material just exiting from the screens.

In preferred embodiment of the process of the present invention, raw Attapulgus clay is mixed with sodium silicate in amounts ranging from 1 to 10% by weight sodium silicate based on the weight of the clay. The sodium silicate is applied as an aqueous solution containing 10 to 50% by weight of the clay of sodium silicate in which the molecular ratio $SiO_2:Na_2O$ lies in the range 1.7:1 to 2.2:1, although other sodium silicates with different ratios, such as O ®-brand and N ®-brand sodium silicates may be used. The mixture of clay and sodium silicate solution is heated to a temperature in the range 400° F. to 600° F. for a sufficient time to reduce the volatile matter when determined at 1200° F. to a value of between 7% and 20%, volatile-free weight, the above-mentioned process being referred to as "activation" hereinafter. Optionally the clay is also treated with 0.3% to 3% of its weight of acetic acid or phosphoric acid, the amount of acid being selected so that the pH of an aqueous slurry of the activated clay lies between 6.0 and 9.5. Optionally the acid may be added to the clay before thermal activation. Preferably the thermally activated clay is treated with the acid for reasons hereinafter set forth.

In an especially preferred embodiment of the process of the present invention, raw Attapulgus clay is mixed with 2% to 6% by weight of the clay of sodium silicate calculated on a dry basis, the sodium silicate is introduced into the clay as an aqueous solution containing 10 to 50% by weight of the clay of sodium silicate in which the molecular ratio $SiO_2:Na_2O$ lies between 1.7:1 and 2.2:1. The silicate solution is added to the clay during mixing in a pug-mill or other suitable equipment. Alternatively, silicate solution may be simply sprayed onto clay prior to drying. During drying the mixture is heated to a temperature in the range 400° to 600° for a time sufficient to reduce its volatile matter at 1200° F. to a value within the range 8% to 18%. This activated clay is then treated with 0.5% to 2.0% of its weight of an 85% by weight aqueous solution of phosphoric acid. Optionally the thermally activated clay is crushed or milled before being treated with the acid.

The following examples show how the process of the invention enables activated sorptive clays to be made by heat treatment at the lower temperature yielding products of comparatively high volatile matter. Thus the process of the present invention obviates the need for higher temperature thermal treatment to expel additional water, and yields a product with acceptable sorptive properties, attrition resistance and pH suitable for use in wet environments. For example, a wet breakdown in the range of about 2-25%, an oil absorption in the range of about 60-120% and a water absorption in the range of about 70-170% may be achieved, as determined by experimental tests described hereinafter.

EXAMPLE 1

This example is given only for comparative purposes and does not embody the present invention.

1000 g. of a raw Attapulgus clay was heated at 525° F. for three hours. The weight loss was 52% and the product was found to contain 2.5% free moisture and a volatile matter at 1200° F. of 17%. The product was crushed and screened and samples of the −12+45 mesh (Tyler) fraction were tested for resistance to attrition in presence of water, for pH of its aqueous slurry, and for oil and water absorption as described hereinafter. All mesh sizes referred to herein are according to Tyler screen sizes.

The product was found to show 92% wet attrition breakdown, oil absorption of 80% and water absorption of 110%. The pH of its aqueous slurry was 7.9.

The material was then further heated to 900° F. for two hours when it lost a further 9.6% by weight. The product contained 4% volatile matter at 1200° F. and gave a wet attrition breakdown of 3%, oil absorption of 100% and water absorption of 120%. The pH of its aqueous slurry was 7.5. These properties are typical of thermally activated Attapulgus clays sold commercially for use in floor absorbents and pet litter.

The example illustrates that a thermally activated Attapulgus clay prepared by heat treatment at 525° F. and yielding a product containing 17% volatile matter at 1200° F. has sorptive properties and pH substantially the same as one prepared at 900° F. and having only 4% volatile matter at 1200° F. More importantly, it shows also that the clay prepared at the lower temperature has virtually no resistance to wet attrition, whereas the clay prepared at the higher temperature is almost completely resistant to wet attrition.

The pH of aqueous slurry was determined by weighing 10 grams of a clay sample into a 250 ml. beaker, adding 90 ml. of distilled water, boiling for about five minutes, cooling and determining the pH electromagnetically (pH meter) with the clay in suspension.

The oil and water absorption of the clay was determined by placing 20 g. of the clay in a cone-shaped fine wire (60 mesh) screen container, immersing the container and contents in SAE 10 oil or water for twenty minutes, removing the container to drain at room temperature for 20 minutes in the case of water and for one hour in the case of oil. The % oil or water retention was then calculated on the basis of the original sample weight.

The degree of wet breakdown or the degree of disintegration of the granular sorbent material in water was determined by placing 50 g. of material of a specified size range (obtained by screening) into a 500 ml. beaker, adding 200-250 ml. of water and boiling for about 5 minutes. The resultant slurry is washed over a limiting screen (the smaller sized screen used for the original sample) and dried at about 200° F. The weight by difference is the % breakdown based on the original weight of the sample. Drying must be done carefully so as not to alter the volatile matter content of the clay sample.

EXAMPLE 2

In this example Attapulgus clay sorbents formed by the process of the present invention are shown to be equivalent to LVM heat-treated grades of Attapulgus clay with respect to water and oil absorption and wet breakdown.

The Attapulgus clay of Example 1 (clay A in Table I below) and another raw Attapulgus clay were mixed with sodium silicate in a pug mill. The aqueous sodium silicate solution was 44% concentration by weight containing $SiO_2/Na_2O$ ratio of about 1.9, and was added at 4.1% of the weight of the clay which was 4,000 g. in the form of lumps of clay. In some cases small amounts of acid were also added during the pugging operation with the aim of reducing product pH. The pugged mixture was thermally activated by heat treatment at 525° F. for 3 hours and subsequently crushed and screened to size (−12+45 mesh). The performance of the product made by this method is summarized in Table I below:

TABLE I

EVALUATION OF ATTAPULGUS SORBENT CLAY MADE WITH SODIUM SILICATE AND ACID ADDITION

| | % Added | | | | | |
|---|---|---|---|---|---|---|
| Clay | Acetic Acid | 85% Phosphoric Acid | % Wet Breakdown | % Oil Absorption | % Water Absorption | pH |
| A | 0.25 | — | 10 | 113 | 162 | 9.4 |
| B | 0.25 | — | 29 | 102 | 165 | 9.3 |
| B | — | 1.6 | 68 | 96 | 170 | 6.8 |
| B | — | 0.8 | 66 | 108 | 167 | 7.8 |
| B | — | — | 11 | 105 | 144 | 9.7 |

It can be noted from the above Table that addition of acid lowered pH into the desired range but at the expense of increased wet breakdown depending upon the amount of acid added. Clays A and B were samples of Attapulgus clay with slightly different volatile matter content as mined. Clay A had 54.3% volatile matter at 1200° F. wherein Clay B had 49.9%. After identical heat treatment Clay A showed 12-15% volatile matter at 1200° F., whereas Clay B showed 6-10%. These variations are to be expected from natural variability in the clay as mined. The performance of the clays were similar after treatment, however, so that the differences do not substantially affect the performance.

EXAMPLE 3

In this example phosphoric acid, which is preferred for its corrosion-preventing ability on iron, was added to the Attapulgus clay-silicate mixture after drying, rather than during the pugging stage as in Example 2. These results are summarized below in Table II. In each case a 6% addition of the same sodium silicate additive used in Example 2 was employed, and a nominal 1% of 85% phosphoric acid was sprayed onto the dried −12+45 mesh product obtained from drying and screening. Since some spray was lost on walls and the like, actual phosphoric acid in the clay was determined by analyzing grab samples for $P_2O_5$ before and after phosphoric acid addition (the clay contains some phosphate naturally).

TABLE II

EVALUATION OF ATTAPULGUS CLAY SORBENT CLAY MADE WITH ADDITION OF PHOSPHORIC ACID AND SODIUM SILICATE

| | % Phosphoric Acid Added | | % Wet | |
|---|---|---|---|---|
| Sample | Nominal | Actual | Breakdown | pH |
| 36 A | — | — | 18 | — |
| 36 B | 0.5 | 0.21 | 11 | 9.7 |
| 36 C | 0.75 | 0.63 | 15 | 9.5 |

TABLE II-continued

EVALUATION OF ATTAPULGUS CLAY SORBENT CLAY MADE WITH ADDITION OF PHOSPHORIC ACID AND SODIUM SILICATE

| | % Phosphoric Acid Added | | % Wet | |
|---|---|---|---|---|
| Sample | Nominal | Actual | Breakdown | pH |
| 36 D | 1.0 | 0.70 | 11 | 9.3 |
| 36 E | 1.0 | 0.88 | 14 | 8.6 |
| 36 F | 1.25 | 1.04 | 13 | 9.2 |

Oil and water absorption of samples 36A-36F were comparable to those of Example 2, i.e. about 90-110% oil absorption and about 140-160% water absorption. It can be seen from the above Table II that wet breakdown of corresponding samples in Example 2. Thus the preferred method of adding the acid is subsequent to the drying step rather than during the pugging or mixing operation.

We claim:

1. In a process for treating raw clay to produce a granular sorbent useful in absorbing oil and water and also having resistance to disintegration when contacted with water, by thermally activating the raw clay by calcination, the improvement whereby the granular sorbent possesses the aforementioned properties but the need to carry out the calcination of the raw clay at very elevated temperatures such as to reduce the volatile matter of the clay to very low values is avoided, said improvement comprising:

mixing the raw clay with an aqueous solution of alkali metal silicate before calcining the raw clay and carrying out the calcination at a temperature below a temperature normally required to thermally activate the raw clay and producing a thermally activated clay composition having a higher volatile matter content than that of clay calcined at the very elevated temperature.

2. The process of claim 1 which includes the further improvement of adding an acid to the clay either before or after the calcination of the clay, said acid being added in an amount such that the pH of the aqueous slurry of the calcined clay is between 6.0 and 9.5.

3. In a process for treating raw attapulgite clay to produce a granular sorbent useful in absorbing oil and water and also having resistance to disintegration when contacted with water by steps which include pugging the raw clay, extruding the clay and activating the clay by calcination, the improvement, whereby a sorbent possessing these characteristics is obtained without calcining the clay at elevated temperatures such as 800° F. to 1000° F. to reduce the volatile matter to a value below 5% by weight, said improvement comprising;

adding sodium silicate solution to the raw clay before or after it is pugged and extruded and calcining the clay so-treated at a temperature in the range of 300° F. to 700° F. to reduce the volatile matter to a value below in the range of 7% and 20% by weight.

4. The process of claim 3, wherein the clay is calcined at a temperature in the range of 400° F. to 600° F.

5. The process of claim 3, wherein the clay is calcined at a temperature in the range of 400° F. to 600° F. to reduce the volatile matter to a value between 8% to 18% by weight.

6. The process of claim 3, wherein an acid is added before or after calcination to neutralize at least partially the added sodium silicate.

7. The process of claim 3, wherein phosphoric acid is added to the calcined attapulgite clay in an amount such that an aqueous slurry of the clay has a pH in the range of 6.0 to 9.5.

8. The process of claim 3, wherein the sodium silicate is characterized by having a molar ratio of $SiO_2$: $Na_2O$ in the range of 1.7:1 to 2.2 to 1.

9. A novel granular sorptive grade of heat-activated attapulgite clay having water and oil absorption properties and resistance to disintegration when in contact with water that are typical of conventional granular grades of heat activated attapulgite clay, said novel granular grade of heat-activated attapulgite clay having a volatile matter content in the range of 7% to 20% and comprising from about 85 to 99% by weight of atttapulgite clay and sodium silicate in the amount from about 1 to 10% by volatile free weight of said clay.

10. The product of claim 9, wherein the sodium silicate is neutralized, at least partially, by the addition of an acid.

11. The product of claim 9, to which phosphoric acid has been added such that the pH of a slurry of the product is in the range of about 6.0 to 9.5.

12. The product of claim 9 or 11, which is further characterized by having a wet breakdown in the range of about 2 to 25%, an oil absorption in the range of about 60 to 120% and a water absorption in the range of about 70 to 170% as determined by methods described herein.

* * * * *